June 16, 1931. R. W. DAVENPORT 1,809,834
METHOD AND MEANS FOR STABILIZING THE
ATMOSPHERE OF REFRIGERATING SYSTEMS
Filed March 25, 1927
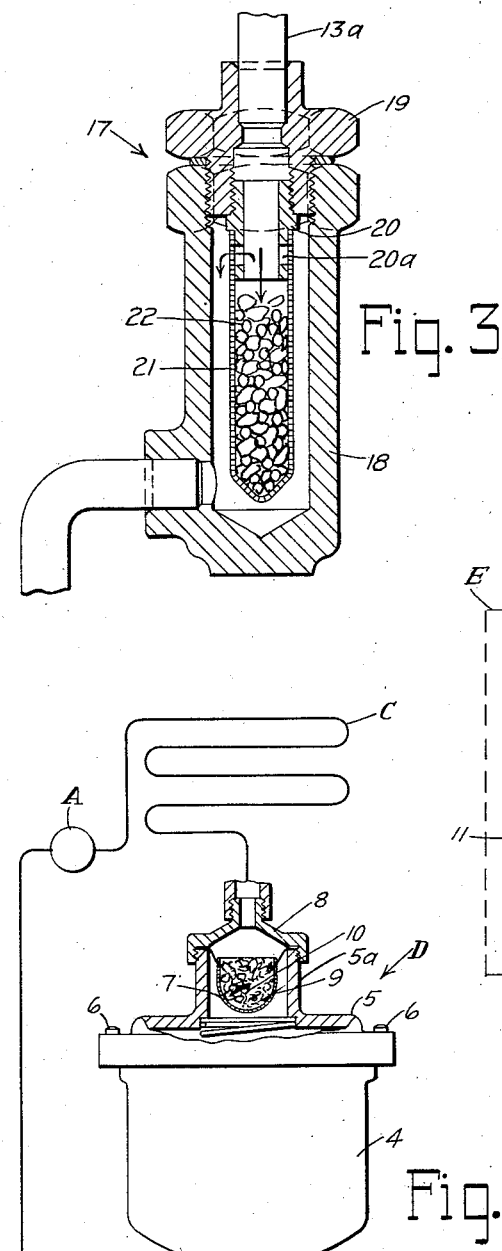
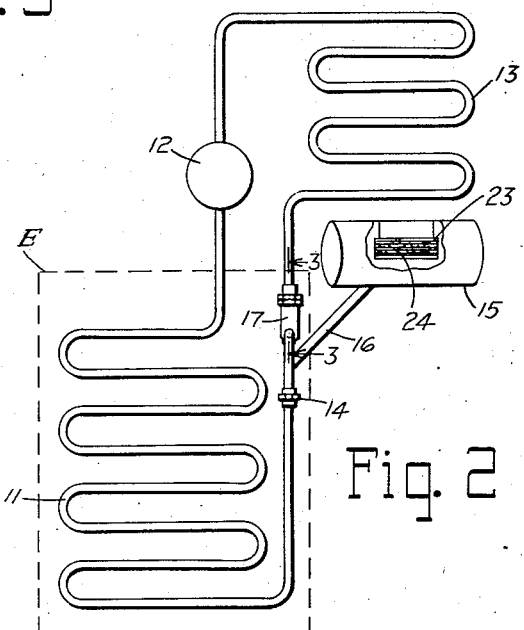
INVENTOR.
Ransom W. Davenport
BY
Ira L. Nickerson
ATTORNEY.

Patented June 16, 1931

1,809,834

UNITED STATES PATENT OFFICE

RANSOM W. DAVENPORT, OF DETROIT, MICHIGAN, ASSIGNOR TO CHICAGO PNEUMATIC TOOL COMPANY, OF NEW YORK, N. Y., A CORPORATION OF NEW JERSEY

METHOD AND MEANS FOR STABILIZING THE ATMOSPHERE OF REFRIGERATING SYSTEMS

Application filed March 25, 1927. Serial No. 178,169.

This invention relates to heat transforming systems, particularly refrigerating systems of the closed cycle type and comprises both method and apparatus aspects. More particularly it relates to ways of stabilizing the working substance which is circulated through the system. In my copending application, Serial No. 116,512, filed June 17, 1926, attention was given to the stabilizing of the working substance by acting upon the latter while in liquid state. The present invention is more directly concerned with acting upon the circulated working substance in its gaseous state. The invention is applicable to refrigerating systems operating upon the straight pumping or reversed Clausius-Rankine cycle as well as upon systems operating on the vapor-gas principle disclosed in my Patent No. 1,619,196 issued March 1st, 1927.

One object of the invention is to provide ways and means for stabilizing refrigerants, particularly when exposure of the same to oxygen (air) and to water is involved. Another object is to provide ways and means for preventing the "atmosphere" in refrigerating systems from oxidizing materials of which the apparatus is constructed. Another object is to control the chemical activity of the gaseous atmosphere in refrigerating systems, especially in those which operate on the vapor-gas principle. Other objects will be apparent from the detailed description which follows:

The atmosphere over a chemically neutral or non-corrosive liquid may differ from the liquid itself, due to the obvious fact that, while certain ions such as basic hydroxyl (OH) ions may be purposely set free in the liquid, they will not evaporate in the atmosphere. The chemical activity of atmosphere containing water vapor and oxygen (as in systems operating on the vapor-gas principle, particularly when air is used as the gas) is considerable, even if the atmosphere be perfectly "neutral" in the sense if having no appreciable chlorine or sulphur content.

The present invention aims to provide a method of stabilizing such an atmosphere by counteracting this chemical activity. The method consists in bringing the atmosphere into contact with suitable reducing material preferably arranged to present an extended area. In a closed cycle system the neutralizing of the chemically active portions of the atmosphere is accomplished at one or more points in the circuit, the preferred place being in the highest-pressure lowest-temperature part of the system. Many reducing agents may be used, it being merely necessary that there be no reaction between the chosen reducing agent and the normal and pure refrigerant vapor, the ammonia, sulphur dioxide, methyl chloride, or what not, but only the specific reaction between the impurities present in the atmosphere within the apparatus and the chosen reducing agent. If the liquid itself is arranged to come in contact with the reducing agent as well as the "atmosphere," means are provided for preventing the reducing agent from being dissolved or carried away by the liquid refrigerant.

In order to illustrate the invention, concrete embodiments thereof are shown in the accompanying drawings; in which:

Fig. 1 is a diagrammatic view of a refrigerating system showing a feeding device or expansion valve incorporating means for stabilizing the "atmosphere" of the refrigerating system;

Fig. 2 is a diagrammatic view of another system showing a different arrangement of elements for stabilizing the working substance;

Fig. 3 is a vertical sectional view on an enlarged scale of one element shown in Fig. 2, the section being taken substantially on the line 3—3 of Fig. 2.

Fig. 1 discloses an improvement in the refrigerating system disclosed in the copending application of myself and Harry S. Estler, Serial No. 114,900, filed June 10th, 1926, the system comprising a pump or compressor A withdrawing the refrigerant vapor and gas from the evaporator element B and discharging it into a condenser C where the vapor is condensed to liquid, the products of condenser C being fed back to evaporator B through float feeding device D. The feeding device D comprises a casing proper 4 provided with a cap or lid 5, the parts being held together by suitable means such as cap screws 6. Since the mechanism within casing 4 of the feeding device does not differ in structure or in function from that of the feeding device disclosed in the aforesaid copending application, Serial No. 114,900 further description thereof is omitted.

In order to accomplish the objects of the present invention and to permit treatment of the atmosphere of the system intermediate condenser C and evaporator B, the cap portion of feeding device D is slightly modified. The modification takes the form of a cylindrical enlargement 5a on cap 5 forming a chamber 7 of substantial size, the top of which chamber is closed by a closure member 8 having screw threaded connection with enlargement 5a and to which the connection from condenser C is secured. Within chamber 7 and immediately beneath the connection from condenser C is suspended or otherwise disposed a container 9 for reducing material 10. In this position the high pressure discharge from condenser C impinges directly upon the reducing material 10 so that the atmosphere of the system comes in direct contact with the same. As the reducing material is subjected to the drip of the condensed or liquid refrigerant, the container 9 is of suitable material such as chamois to permit the passage of the liquid while preventing the same from carrying away any of the reducing material.

Fig. 2 shows a closed cycle refrigerating system of the vapor-gas type such as disclosed in my copending application, Serial No. 126,783 filed August 3rd, 1926. The system comprises an evaporator 11 which is disposed in a refrigerating chamber indicated diagrammatically at E, a pump 12 withdrawing gas and vapor from evaporator 11 and discharging the same at higher temperature and pressure into condenser 13 where heat is extracted, and the condensed liquid and residual gas and vapor passes back into evaporator 11 through a suitable feeding device or expansion valve 14, the high pressure side of the system having its capacity increased by any suitable or desired means, such for example as tank 15 connected into the system by a single pipe 16 just above valve 14. In this system stabilizing of the atmosphere is effected at two points, both on the high pressure side of the system and preferably in thermal intimacy with the low pressure zone.

To this end means are provided for subjecting all of the atmosphere or gaseous products discharged from condenser 13 to a reducing agent and for subjecting the atmosphere in a storage chamber 15 also to the same or a different reducing agent. For the first means a combined filter, strainer and treating unit 17 is provided in refrigerating chamber E in the connection between valve 14 and condenser 13 but above connection 16. This unit, shown in vertical section in Fig. 3 comprises a hollow member 18 substantially cylindrical in form having an interiorly threaded upper end, adapted to be closed by a plug member 19 to which the pipe 13a from condenser 13 is directly connected. The lower end of plug 19 has secured thereto, as by threaded engagement, a short conduit member 20 which projects beyond the plug and has a series of annular ports 20a. Secured to the projecting portion of conduit 20 is an elongate container 21 for reducing material 22. While container 21 may be formed of chamois or other similar material, in the present instance it is preferably formed of woven wire cloth of very fine mesh made from metal having superior corrosive-resisting properties, such as Monel metal. With this arrangement, as with the form shown in Fig. 1, the products of condenser 13 impinge directly upon the reducing material 22. The atmospheric portion of the products escapes through ports 20a and through the upper part of container 21 while the liquid seeps through the reducing material 22 and is filtered and strained by the latter and by container 21. As to the treating means for the atmosphere in chamber 15, a woven wire or other suitable container 23 for reducing material 24 is provided, the container being suspended or otherwise suitably disposed within tank 15.

The reducing agents utilized for stabilizing the atmosphere in the refrigerating system shown, or in any known or conventional system of the closed cycle type, will depend to a considerable extent upon the volatile liquid used, also upon the gas which is selected to be used with the liquid in case the system is to operate on the vapor-gas principle. Reducing agents for use with hydrocarbon refrigerants include iron, which may be in the form of a mass of clean steel wool, and zinc in a similarly extended form, also stannous oxide, magnesium, calcium, barium, etc. in powdered or granular form. When ammonia is used as the working substance, stannous oxide or iron is preferable as amides may be formed with alkali metals. Any of the above mentioned alkali metals may be used as reagents when sulphur dioxide is the refrigerant. With carbon dioxide, however, alkali metals are not suitable since there is a tendency to form carbonates; hence iron or stannous oxide should be used.

It is to be noted that a preferred position for the reducing agent is at the highest-pressure, lowest-temperature point in the system, by which is meant, the point where the lowest temperature exists for a given pressure. For example on the high side of the system such a point exists where the condensate has been cooled to the minimum temperature after passing through the condenser. The temperature of the products discharged from the compressor before entering the condenser is much higher and such a point is not so suitable. On the low side, the highest-pressure, lowest-temperature point will be close to the liquid in the evaporator, since beyond this point the pressure is lower and the temperature is higher,— that is, the vapor tends to superheat between evaporator and compressor as is also the case between the compressor and the condenser. Such points of relatively high temperature are less desirable locations for the reducing agent.

While the ways and means by which the atmospheres of refrigerating systems may be stabilized have been herein shown and described in what is now considered to be preferred forms, it is to be understood that the invention is not restricted to the specific details thereof, but covers all changes, modifications and adaptations within the scope of the appended claims.

I claim as my invention:

1. The method of stabilizing the atmosphere contained in a refrigerating system of the closed cycle type which comprises continuously acting upon said atmosphere in the highest pressure lowest temperature part of the system to remove any active oxidizing components of said atmosphere.

2. In a closed cycle refrigerating system of the compressor condenser-evaporator type means in the highest pressure lowest temperature zone of said system for subjecting the atmosphere of the system to a reducing agent for removing all active oxidizing components.

3. A refrigerating system comprising a compressor, a condenser, and an evaporator connected together to form a closed cycle system, a feeding device adapted to pass both the gaseous and the liquid products of said condenser into said evaporator, a mass of reducing material for removing active oxidizing components from said products, and means causing said products to impinge directly upon said mass.

4. A refrigerating system comprising a compressor, a condenser and an evaporator connected together to form a closed cycle system, a feeding device adapted to pass both the gaseous and the liquid products of said condenser into said evaporator, means subjecting said products to a reducing agent before reaching said device, a storage chamber for gaseous refrigerant intermediate said means and said device, and a foraminous container for reducing material within said chamber.

5. A refrigerating system comprising a compressor, a condenser, and an evaporator connected together to form a closed cycle system, a feeding device for controlling the movement of the working substance, a storage chamber for the gaseous products of the condenser out of the normal path of movement through the system, and means acting upon the contents of said chamber to maintain the same in a substantially oxygen-free condition.

Signed at Detroit, in the county of Wayne, and State of Michigan this 21st day of March, 1927.

RANSOM W. DAVENPORT.